(12) United States Patent
Nakada et al.

(10) Patent No.: US 7,154,820 B2
(45) Date of Patent: Dec. 26, 2006

(54) OPTICAL ELEMENT FOR ENHANCED TRANSMISSION OF LIGHT AND SUPPRESSED INCREASE IN TEMPERATURE

(75) Inventors: Matsafumi Nakada, Kawasaki (JP); Tineke Thio, Princeton, NJ (US)

(73) Assignee: NEC Corporation, Tokyo (JP)

( * ) Notice: Subject to any disclaimer, the term of this patent is extended or adjusted under 35 U.S.C. 154(b) by 882 days.

(21) Appl. No.: 10/337,039

(22) Filed: Jan. 6, 2003

(65) Prior Publication Data
US 2004/0131001 A1    Jul. 8, 2004

(51) Int. Cl.
*G11B 11/00* (2006.01)
*G11B 7/00* (2006.01)

(52) U.S. Cl. .................. 369/13.32; 369/112.27; 385/129; 250/216

(58) Field of Classification Search ............. 369/13.32, 369/112.27, 44.37, 112.26, 13.05, 44.2, 13.15, 369/44.38, 300, 13.33; 250/216, 201.3, 307, 250/234; 385/129, 146
See application file for complete search history.

(56) References Cited

U.S. PATENT DOCUMENTS

| | | | |
|---|---|---|---|
| 5,199,090 A * | 3/1993 | Bell | 385/33 |
| 5,598,387 A * | 1/1997 | Pohl | 369/44.37 |
| 5,846,843 A * | 12/1998 | Simon | 436/527 |
| 5,973,316 A | 10/1999 | Ebbesen et al. | |
| 6,040,936 A | 3/2000 | Kim et al. | |
| 6,052,238 A | 4/2000 | Ebbesen et al. | |
| 6,236,033 B1 | 5/2001 | Ebbesen et al. | |
| 6,285,020 B1 | 9/2001 | Kim et al. | |
| 6,649,901 B1 * | 11/2003 | Thio et al. | 250/216 |
| 6,834,027 B1 * | 12/2004 | Sakaguchi et al. | 369/13.32 |

FOREIGN PATENT DOCUMENTS

| | | |
|---|---|---|
| JP | 2000-207767 | 7/2000 |
| JP | 2001-133618 | 5/2001 |
| JP | 2001-291265 | 10/2001 |
| JP | 2002-288010 | 9/2002 |

OTHER PUBLICATIONS

E. Betzig et al "Near-Field Optics: Microscopy, Spectroscopy, and Surface Modification Beyond the Diffraction Limit", Science, vol. 257, pp. 189-194, Jul. 1992.
G.A. Valaskovic et al. "Parameter Control, Characterization, and Optimization in the Fabrication of Optical Fiber Near-Field Probes", Applied Optics, vol. 34, No. 7, pp. 1215-1227, 1995.
H. A. Bethe, "Theory of Diffraction by Small Holes," Physical Review, vol. 66, Nos. 7 and 8, pp. 163-182, Oct. 1944.
Lezec H.J. et al., "Beaming Light from a Subwavelength Aperture", Science 297:820-822 (2002).

* cited by examiner

*Primary Examiner*—Ali Neyzari
(74) *Attorney, Agent, or Firm*—Scully, Scott, Murphy & Presser, P.C.

(57) ABSTRACT

An optical element structure allowing an increased power density of aperture-transmitted light while suppressing increase in temperature is disclosed. A conductive film has a sub-wavelength aperture formed therein and a periodic surface topography formed thereon. A lens focuses light onto the periodic surface topography with a predetermined diameter. The predetermined diameter of incident light on the conductive film and a period of the periodic surface topography are determined so that a power ratio of aperture-transmitted light to the light beam is greater than that of aperture-transmitted light which would be obtained if no periodic surface topography is provided in the conductive film.

34 Claims, 11 Drawing Sheets

OPTICAL ELEMENT FOR ENHANCED TRANSMISSION OF LIGHT AND SUPPRESSED INCREASE IN TEMPERATURE

BACKGROUND OF THE INVENTION

1. Field of the Invention

The present invention relates to an optical element provided with a conductive film having a subwavelength aperture and a surface topography formed therein, an optical head and optical data recording/reading apparatus using the optical element.

2. Description of the Related Art

An optical recording medium, such as a CD-ROM (Compact Disk-Read Only Memory) or DVD (Digital Video Disk), has various advantages including the capability of storing large quantities of data, compact design, portability, and robustness. As recording media and data recording/reading apparatuses drop in price, such an optical recording medium becomes increasingly attractive. The data density in optical recording media is desirably higher particularly for storing long-playing video data.

It is known well that the data density in optical recording media is determined by the size of pits on the optical recording medium, which is limited by the diameter of a focused laser beam on the optical medium. Accordingly, the data density in optical media can be increased by reducing the diameter of the laser beam.

In the case of an existing optical system in which a distance between an optical head and an optical recording medium is much greater than the wavelength of the laser beam, the minimum length of pits is determined by diffraction limit. More specifically, the diameter of a focused laser beam on the optical medium is limited to $\lambda/2$ by diffraction, where $\lambda$ is the wavelength of the laser beam. This is a known phenomenon called the diffraction limit. For example, even when a blue laser is used which is a visible-light laser having the minimum wavelength at present, the minimum length of pits is limited to about 200 nm.

However, the length of pits can be reduced to 50 nm or less through near-field optics, in which an optical head having an aperture smaller than the wavelength of laser light is placed at a distance not larger than the size of the aperture from the optical recording medium and scanned over its surface. In this near-field optics, the length of pits is determined only by the size of the aperture. Accordingly, higher data densities and higher-speed data writing and reading can be achieved through the near-field optics.

These advantages of the near-field optics can be also obtained using a red diode laser, which is at present reliable and easily available at relatively low cost. In addition, it is possible to produce the optical head by directly coupling to an optical fiber or a semiconductor waveguide without the need of using a relatively heavy and big objective lens. This allows mechanical design of flying-type or contact-type head to be simplified.

A typical near-field scanning optical head is made by using a tapered optical fiber to achieve such an aperture smaller than the wavelength of laser light. However, the laser light is subject to substantial attenuation during propagation to the sub-wavelength aperture and thereby it is difficult to obtain a sufficient intensity of light required for writing data on the optical recording medium. See the following papers:

E. Betzig et al "Near-Field Optics: Microscopy, Spectroscopy, and Surface Modification Beyond the Diffraction Limit" (Science, Vol. 257, pp. 189–194, July 1992)

G. A. Valaskovic et al. "Parameter Control, Characterization, and Optimization in the Fabrication of Optical Fiber Near-Field Probes" (Applied Optics, Vol. 34, No. 7, pp. 1215–1227, 1995).

In a typical near-field optical head, material forming the sub-wavelength aperture is usually metal. However, the amount of light (or throughput) passing through the sub-wavelength aperture made of metal is very small: The throughput, which is defined to be $I_T/I_{inc}$, where $I_T$ is the total transmitted power density or intensity at the aperture exit and $I_{inc}$ is the total incident power intensity, is predicted to decrease with aperture diameter in approximate proportion to $$\frac{I_t}{I_{inc}} \sim \left(\frac{d}{\lambda}\right)^4,$$

where d is the diameter of the aperture and $\lambda$ is the wavelength of light (see H. A. Bethe, "Theory of Diffraction by Small Holes," Physical Review, Vol. 66, Nos. 7 and 8, pp. 163–182, October 1944).

On the other hand, there is known a fact that the intensity of light passing through one or more subwavelength-diameter aperture perforating through a conductive film is remarkably increased by periodically arranging a plurality of apertures or providing a periodic surface topography associated with at least one aperture on the conductive film. See the following U.S. patents:

Ebbesen et al. U.S. Pat. No. 5,973,316;
Kim et al. U.S. Pat. No. 6,040,936;
Ebbesen et al. U.S. Pat. No. 6,052,238;
Ebbesen et al. U.S. Pat. No. 6,236,033 B1; and
Kim et al. U.S. Pat. No. 6,285,020 B1.

According to experimental results, the rate of increase in the intensity of light in some cases reaches up to $I_T/I_{inc} \approx 2$. It is thought that the light incident on the surface of the conductive film interacts in a resonant way with a surface plasmon (SP) mode on the surface, resulting in enhanced electromagnetic fields at the conductive surface and thence enhanced transmission of light through at least one aperture in the conductive film.

An improved near-field optical head has been disclosed in Japanese Patent Application Unexamined Publication No. P2001-291265A, which corresponds to U.S. patent application Ser. No. 60/185,239 filed Feb. 28, 2000 and Ser. No. 09/721,694 filed Nov. 27, 2000, each of which are incorporated herein by reference. This conventional near-field optical head uses surface plasmon-enhancement caused by a subwavelength-diameter aperture and a periodic surface topography to achieve a very high power density of transmission of light and fine resolution. A schematic structure of this conventional near-field optical head is shown in FIG. 1.

In FIG. 1, a read/write head 500 is provided with a waveguide 510 and a plasmon-enhanced device (PED) 520. The waveguide 510 is tapered to make the cross-sectional area of an end surface 512 smaller, which is placed near an optical recording medium 50. A distance z between the end surface 512 and the surface of the optical recording medium 50 is set to the order of the diameter of an aperture 530.

The plasmon-enhanced device 520 is formed on the end surface 512 to enhance the transmission efficiency of light incident from the waveguide 510 and passing through the plasmon-enhancing device 520. The plasmon-enhanced [etc.] device 520 is provided with a metal film 522 that is preferably made of silver and has the aperture 530 perforating through the plasmon-enhancing device 520. The resolution of this read/write head 500 is determined by the dimensions of the-aperture 530. The diameter d of the aperture 530 is equal to or smaller than the wavelength of the incident light and corresponds to the dimensions of a pit recorded on the optical recording medium 50. The transmitted light has power intensity sufficient for forming pits. In the case of the optical recording medium 50 being of phase-change type, the intensity of writing light is set to be sufficiently high to the extent of locally fusing the phase-change optical recording medium.

The metal film 522 is further provided with a periodic surface topography 540, which allows a very large amount of transmitted light to form a subwavelength read/write light spot, resulting in a data density much higher than obtained by diffraction limit. A smaller spot causes both a higher data density and a higher reading speed. These advantages can be achieved by using a commercially available and not expensive laser, that is, without having to use a shorter-wavelength laser.

As described above, such enhanced transmission of light using the surface plasmon-enhancement needs the application of incident light to the surface topography formed around the small aperture. In the case of a single aperture having no surface topography, the incident light is simply applied to the small aperture.

Accordingly, in the case of using the surface plasmon-enhancement, the incident light should be applied to a wider area including the surface topography, which for fixed total laser power means that the power density of light is lower. Since the power density of light for writing information on the optical recording medium must be higher than a certain threshold, it is necessary to apply an increased power of incident light to the wider area so as to obtain a sufficient power density of light passing through the small aperture.

Further, the application of an increased power of incident light to the conductive film causes the conductive film and the surface of the optical recording medium adjacent thereto to increase in temperature, resulting in decreased reliability.

SUMMARY OF THE INVENTION

An object of the present invention is to provide an optical element structure allowing an increased power density of light passing through a subwavelength aperture surrounded by a surface topography on a conductive film while suppressing an increase in temperature caused by an increased power of incident light.

According to the present invention, the size of a light beam applied to a periodic surface topography on a conductive film and the period of the periodic surface topography are determined so as to maximize a light power efficiency of output light transmitted through the aperture with respect to a reference input light.

According to an aspect of the present invention, an optical element includes: an optical element body; a focus lens for focusing an incident light to produce a focused light beam of a predetermined diameter; and a conductive film having a first surface and a second surface, the first surface facing the optical element body, wherein the conductive film further has an aperture provided therein and perforating from the first surface to the second surface, and a periodic surface topography provided on one of the first and second surfaces thereof. The conductive film is located at the focal plane of the focus lens. The predetermined diameter of the focused light beam on the first surface and a period of the periodic surface topography are determined so that, with respect to a power of the focused light beam on the first surface, a power of transmitted light through the aperture is greater than that of transmitted light which would be transmitted through the aperture if no periodic surface topography is provided in the conductive film.

The periodic surface topography may include a plurality of surface features periodically arranged around the aperture. The plurality of surface features may be further concentrically arranged around the aperture.

The surface features may include one selected from a shape group consisting of depression, semi-spherical protrusion, groove, protrusion, ring-shaped depression, ring-shaped and semi-spherical protrusion, ring-shaped groove, and ring-shaped protrusion.

The diameter of the light beam is preferably determined within a range from two periods to seven periods of the periodic surface topography.

The aperture has a diameter smaller than a wavelength of the light beam. Preferably, a ratio $(d/\lambda)$ of the diameter d of the aperture to the wavelength $\lambda$ of the light beam is not greater than 0.3. The aperture is further preferably filled with a transparent dielectric.

According to another aspect of the present invention, a layer of optical material having a refractive index higher than that of the optical element body is provided on at least one of the first and second surfaces of the conductive film. The addition of this layer reduces the lattice constant required for operation at a given wavelength and therefore decreases the total irradiation area necessary to obtain a given transmission enhancement. The optical material may include at least one selected from a group consisting of titanium oxide, zirconium oxide, tantalum oxide, alumina, silicon nitride, and silicon.

According to another aspect of the present invention, a high-thermal-conductivity layer of material having a thermal conductivity higher than that of the optical element body is provided between the conductive film and the optical element body. The material may include at least one selected from a group consisting of diamond, beryllium oxide, nickel oxide, alumina, silicon nitride, amorphous carbon, silicon, and germanium.

The present invention may be applied to an optical head. An optical head placed near an optical recording medium, includes: a wave guide for guiding light emitted from a light source; a light condenser optically connected to the wave guide, for focusing the incident light to produce a focused light beam at a predetermined diameter; and a conductive film having a first surface and a second surface, the first surface facing the light condenser, the conductive film being located at the focal plane of the light condenser, wherein the conductive film further has an aperture provided therein and perforating from the first surface to the second surface, and a periodic surface topography provided on one of the first and second surfaces thereof, wherein the aperture is placed near a surface of the optical recording medium. The predetermined diameter of the light beam on the first surface and a period of the periodic surface topography are determined so that, with respect to a power of the light beam on the first surface, a power of transmitted light through the aperture is greater than that of transmitted light which would be transmitted through the aperture if no periodic surface topography is provided in the conductive film.

The optical head may further include a slider for floating the optical head on the surface of the optical recording medium at a predetermined height when the optical recording medium is rotating.

According to an embodiment of the optical head, the wave guide includes an optical fiber; and the light collector includes: a collimating lens for collimating the light emitted from the optical fiber; a light direction changer for changing a direction of the collimated light beam at a predetermined angle; and a focus lens for focusing the collimated light beam incident from the light direction changer, wherein the second surface of the conductive film is substantially flush with a floating surface of the slider.

The optical head may be applied to a write and read head, which further includes a photo detector for detecting light reflected off the surface of the optical recording medium to read information from the optical recording medium, wherein the photo detector is placed near the aperture.

The photo detector is preferably provided in the conductive film at a position placed near the aperture on the second surface of the conductive film.

The present invention may be applied to an optical recording and reading apparatus. First, an apparatus for recording and reading information to and from an optical recording medium, includes: an optical head; and a head actuator for moving the optical head to a desired position on the optical recording medium. The optical head includes: a wave guide for guiding light emitted from a light source; a light condenser optically connected to the wave guide, for focusing the incident light to produce a focused light beam; a conductive film having a first surface and a second surface, the first surface facing the light condenser, wherein the conductive film further has an aperture provided therein and perforating from the first surface to the second surface, and a periodic surface topography provided on one of the first and second surfaces thereof, wherein the aperture is placed near a surface of the optical recording medium; and a photo detector for detecting light reflected off the surface of the optical recording medium to read information from the optical recording medium, wherein the photo detector is placed near the aperture, wherein a diameter of the focused light beam on the first surface and a period of the periodic surface topography are determined so that, with respect to a power of the focused light beam on the first surface, a power of transmitted light through the aperture is greater than that of transmitted light which would be transmitted through the aperture if no periodic surface topography is provided in the conductive film.

Second, an apparatus for recording and reading information to and from an optical recording medium, includes: an optical write head for writing information to the optical recording medium by irradiating the optical recording medium with a writing light beam; an optical read head for reading information from the optical recording medium by detecting a light beam transmitted through the optical recording medium; and a head actuator for moving the optical write head and the optical read head to a desired position on the optical recording medium, wherein the optical write head comprises: a wave guide for guiding light emitted from a light source; a light condenser optically connected to the wave guide, for focusing the incident light to produce a focused light beam; and a conductive film having a first surface and a second surface, the first surface facing the light condenser, wherein the conductive film further has an aperture provided therein and perforating from the first surface to the second surface, and a periodic surface topography provided on one of the first and second surfaces thereof, wherein the aperture is placed near a surface of the optical recording medium, wherein a diameter of the focused light beam on the first surface and a period of the periodic surface topography are determined so that, with respect to a power of the focused light beam on the first surface, a power of the writing light beam transmitted through the aperture is greater than that of transmitted light which would be transmitted through the aperture if no periodic surface topography is provided in the conductive film.

Third, an apparatus for recording and reading information to and from a magneto-optical recording medium, includes: a write head for optically writing information to the magneto-optical recording medium by irradiating the optical recording medium with a writing light beam; a read head for reading information from the magneto-optical recording medium by detecting leakage magnetic flux from the magneto-optical recording medium using magnetoresistance effect; and a head actuator for moving the write head and the read head to a desired position on the optical recording medium, wherein the write head includes: a wave guide for guiding light emitted from a light source; a light condenser optically connected to the wave guide, for focusing the incident light to produce a focused light beam; and a conductive film having a first surface and a second surface, the first surface facing the light condenser, wherein the conductive film further has an aperture provided therein and perforating from the first surface to the second surface, and a periodic surface topography provided on at least one of the first and second surfaces thereof, wherein the aperture is placed near a surface of the optical recording medium, wherein a diameter of the focused light beam on the first surface and a period of the periodic surface topography are determined so that, with respect to a power of the focused light beam on the first surface, a power of the writing light beam transmitted through the aperture is greater than that of transmitted light which would be transmitted through the aperture if no periodic surface topography is provided in the conductive film.

As described above, the diameter of the focused light beam on the first surface of the conductive film and the period of the periodic surface topography are determined so that a power ratio of aperture-transmitted light to the incident light beam is greater than that of aperture-transmitted light which would be obtained if no periodic surface topography is provided in the conductive film. Such an optical element structure allows an increased power density of light passing through the sub-wavelength aperture surrounded by the periodic surface topography on the conductive film while suppressing increase in temperature caused by an increased power of the light beam.

DESCRIPTION OF THE PREFERRED EMBODIMENTS

Principle of the Invention

1) Sample

Figure 1:
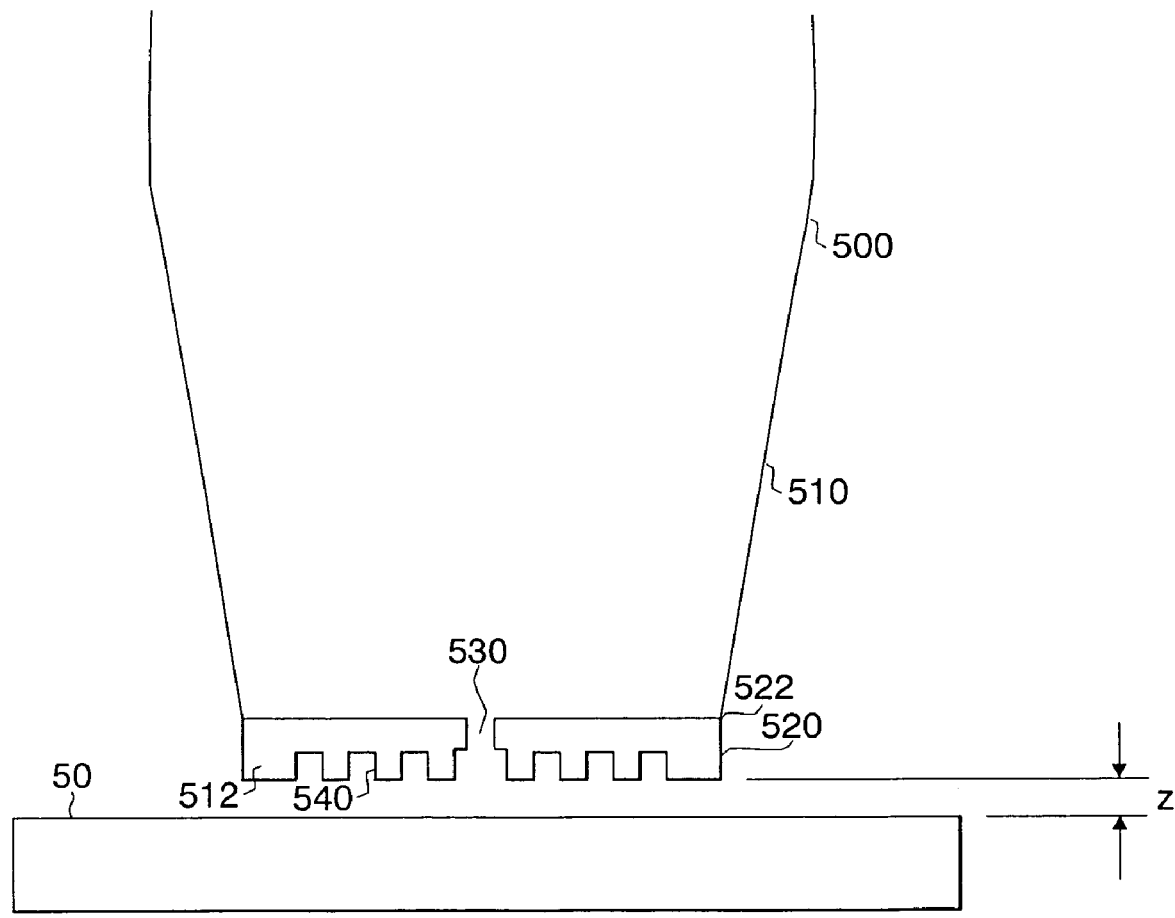
FIG. 1 is a sectional side view showing a conventional optical element.
Figure 2A:
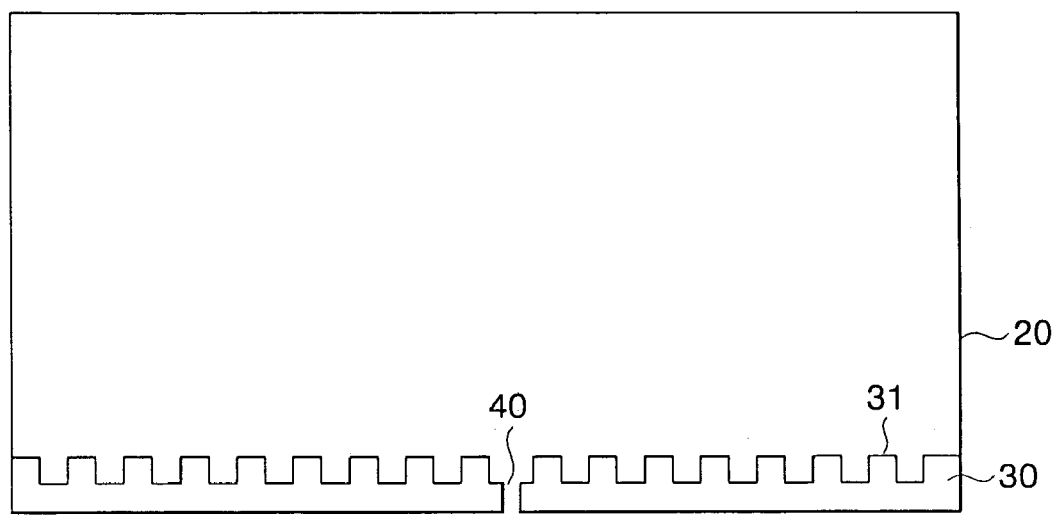
FIG. 2A is a sectional side view of a conductive film employed in an example of an optical element for explaining the principle of the present invention.
Figure 2B:
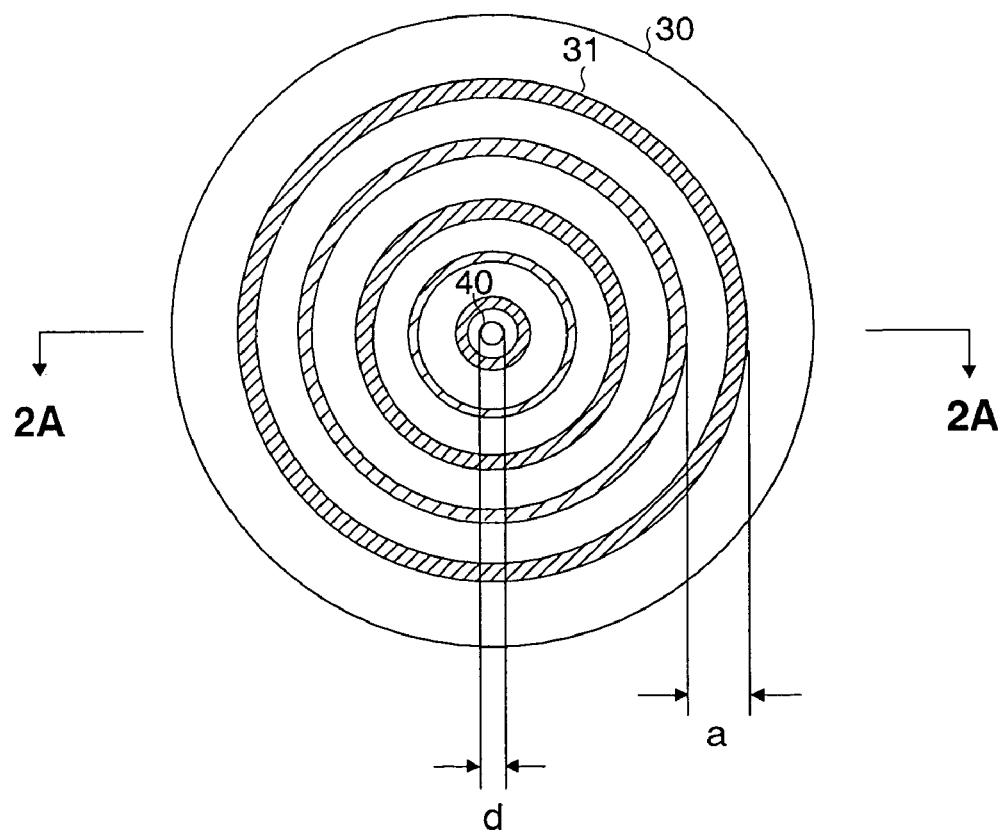
FIG. 2B is a plan view of the conductive film as shown in FIG. 2A.

As shown in FIGS. 2A and 2B, a sample of the optical element is composed of a conductive film 30, which is provided on an end surface of an optical element body 20, has a periodic surface topography 31 included in the surface of the conductive film 30 facing the optical element body 20 and an aperture 40 formed at the center thereof. A surface including the periodic surface topography 31 is provided with a plurality of depressions concentrically arranged in a periodic pattern. The aperture 40 is placed at the center of the concentric pattern.

Here, using a glass substrate as the optical element body 20, the sample was formed by the following steps. First, the surface of the glass substrate was etched using a focused ion beam system (FIB) to produce a concentric pattern of depressions about 100 nm in depth with a period of 750 nm. Thereafter, an Ag film 300 nm thick was deposited on the concentric pattern of depressions by DC sputtering to produce the periodic surface topography 31. At the center of the concentric pattern of depressions, the aperture 40 having a diameter of 200 nm was formed using the FIB. A thin adhesion layer (1–5 nm of Cr or $T_i$) (not shown) may be provided between the Ag film and the optical element body. Such an adhesion layer has no effect on the transmission enhancement but increases the stability of the Ag film. The Ag film could be a sandwich, e.g. with Si or Ni, as long as the skin is Ag.

To produce the surface plasmon enhancement, the period a of the periodic surface topography 31 for square cross section grooves is needed to satisfy the following equation:

$$\lambda_{SP} = \frac{a}{\sqrt{i^2 + j^2}} \sqrt{\frac{\varepsilon_d \varepsilon_m}{\varepsilon_d + \varepsilon_m}} \quad (1)$$

where λ is a wavelength of light used, ε m is dielectric constant of the conductive film, ε d is dielectric constant of a dielectric on the periodic surface topography 31, and i, j are integers. The case where i+j=1 produces the highest transmission enhancement. The preferred cross section is circular grooves. The period a for circular grooves is found from the following equation:

$$\lambda_{SP} = \frac{a}{j} \sqrt{\frac{\varepsilon_d \varepsilon_m}{\varepsilon_d + \varepsilon_m}} \quad (2)$$

2) Problem

As described before, when the radius of the irradiated area on the conductive film 30 is increased to cover all of the periodic surface topography 31, it is necessary to apply an increased power of incident light to the periodic surface topography 31 so as to maintain a sufficient power density of light passing through the aperture 40. On the other hand, as the radius of the irradiated area is reduced, the surface plasmon enhancement is made smaller and thereby a sufficient power density of light passing through the aperture 40 cannot be achieved.

Accordingly, an irradiation radius of incident light is a very important factor in the design of the optical element. From the viewpoint of the number of periods of the periodic surface topography 31, an optimal irradiation radius of the incident light can be experimentally determined as described below. For example, the number of periods of concentrically arranged periodic rings is the number of rings.

3) Irradiation Condition

Five samples each having number of periods 0, 2, 3, 6, and 10 were produced as described above in a free-standing membrane, Ag—Ni—Ag. A more detailed description of the fabrication method can be found in Grupp, et al., Appl. Phys. Lett. 77, 1569 (2000). At λ=800 nm, a lattice constant of P=750 nm gives maximum plasmon enhancement; the aperture diameter was d=300 nm. The sample having the number of periods of 0 has no surface feature, that is, has a substantially smooth surface around the aperture. The surface of each sample was irradiated from the Ag film side with a parallel beam of white light over an area much larger than the area of surface corrugation. The light power of the transmitted light for each sample was measured by a microspectroscope.

Figure 3:
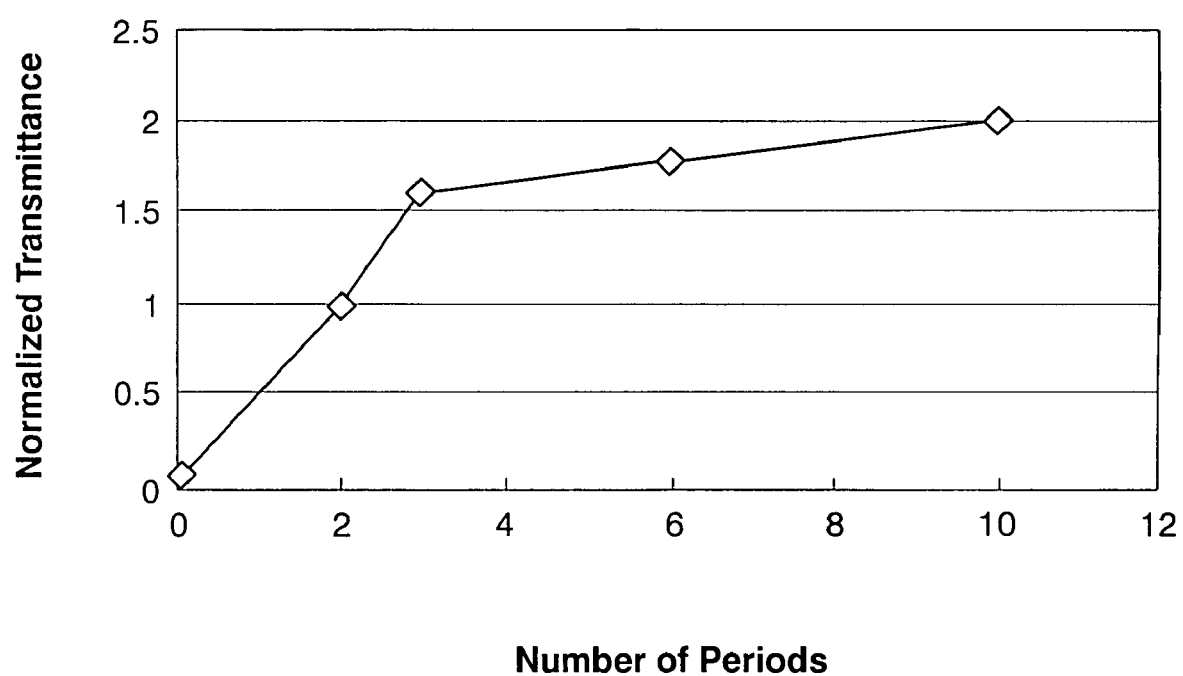
FIG. 3 is a graph showing the normalized amount of transmitted light through an aperture as a function of the number of periods of concentrically formed depressions.

In FIG. 3, the vertical axis represents a normalized transmittance, which is obtained by normalizing the transmitted light power intensity through the aperture with power of incident light on the aperture:

$$T_n = \frac{I_t}{I_{inc}}$$

where $T_n$ is the normalized transmittance. The normalized transmittance $T_n$=1 physically means that all the light power incident on the aperture is transmitted as it is through the aperture. Tn<1 means attenuation with respect to the macroscopic limit. "Enhancement" usually is normalized to the bare aperture with no surface corrugation. See, e.g. Thio, et al., Optics Letters, 26, 1972–4 (2001) In the case of the sample having no rings, i.e. the number of periods N=0, the normalized transmittance $T_n$ is not greater than 0.1, which means that the transmitted light power is very small. Forming concentric depressions as the periodic surface topography 31 around the aperture 40 increases the normalized transmittance $T_n$. When the number of periods exceeds 2, the normalized transmittance $T_n$ becomes greater than 1. As the number of periods increases, the normalized transmittance $T_n$ becomes larger.

On the other hand, all of the periodic surface topography 31 of each sample was uniformly irradiated with a constant incident light power. A normalized power density of incident light and a light power efficiency were plotted for each sample as shown in FIG. 4.

Figure 4:
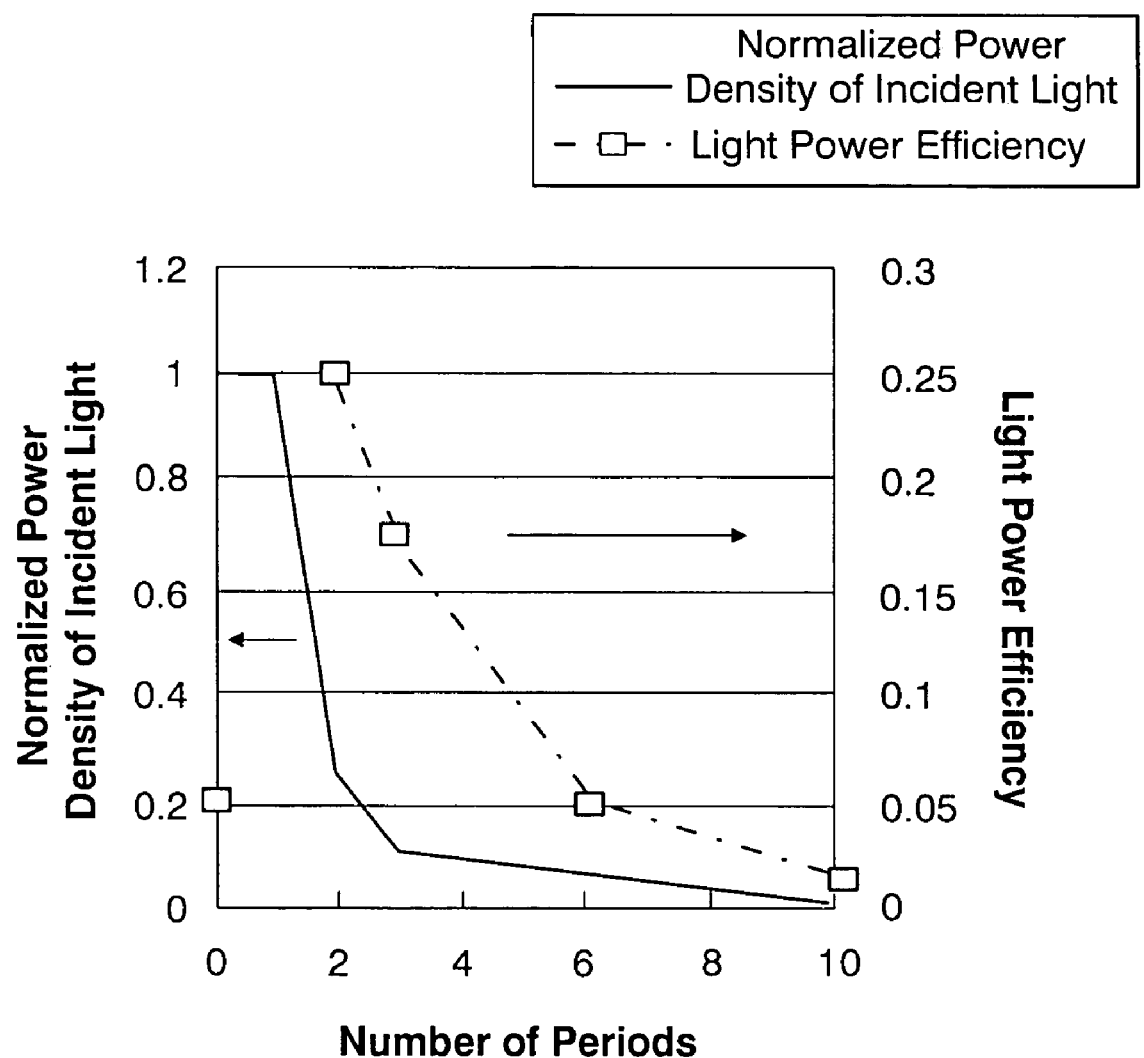
FIG. 4 is a graph showing the normalized power density of incident light and the light power efficiency as a function of the number of periods of concentrically formed depressions.

In FIG. 4, the normalized power density of incident light is obtained by normalizing a power density of incident light for each sample with that obtained when the incident light is applied to the periodic surface topography 31 having a number of periods of 1. An irradiation radius in the case of the number of periods of 1 is in the order of 1 μm, which can be sufficiently realized by an optical system with fixed focusing lens. When the irradiation radius increases with the number of periods increasing, the irradiated area increases with the square of the irradiation radius. Accordingly, the normalized power density of incident light sharply decreases with increasing of the number of periods.

We define as the figure of merit the light power efficiency: $LPE=I_t/P_{inc}$ where $P_{inc}$ is the incident power (W) and $I_t$ is the transmitted power density, $I_t=P_t/(\Pi d^2/4)$ (W/cm$^2$); here $P_t$ is the transmitted power (W) and $\Pi d^2/4$ is the exit area of the aperture. For completeness, we define also the incident power density, $I_{inc}=P_{inc}/\Pi N^2 \lambda^2$ (W/cm$^2$).

For an SP (surface plasmon) enhanced device with an optimal corrugation geometry, $I_t/I_{inc}=3$ (at the peak λ, and for large N), independent of d. But for a bare hole in a real silver film, the transmission follows $I_t/I_{inc} \sim d^2$ (note, this result from our experiments is less steep than the $I_t/I_{inc} \sim d^4$ relation predicted by Bethe, possibly because at d≧200 nm and λ=800 nm the samples are not very deep in the subwavelength regime). This is indicated in FIG. 5A by the spots at N=½ (the diffraction limit).

Figure 5A:
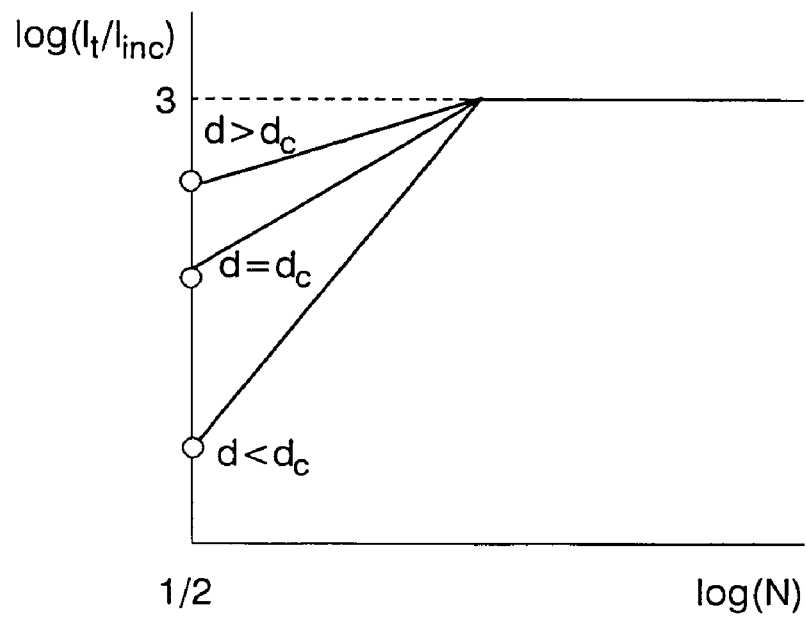
FIG. 5A is a graph showing the corrugation geometry $I_t$-$I_{inc}$ for various values of hole diameter d.

As suggested by FIG. 5A, the dependence on how the bare hole (N=½) behaviour connects with the asymptotic behaviour for large number of rings, depends very strongly on the diameter of the aperture. This is because the bare hole transmission depends strongly on the diameter whereas the SP enhanced $I_t/I_{inc}$ is independent of d.

Figure 5B:
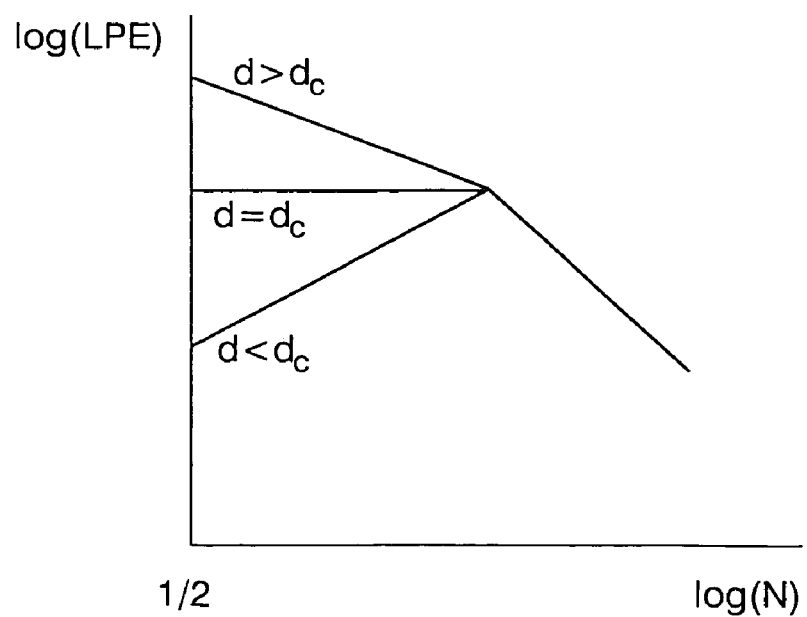
FIG. 5B is a graph showing the corresponding illumination diameter dependence of the figure of merit LPE, for various values of the hole diameter d.

The graph of FIG. 5B shows the corresponding illumination diameter dependence of the figure of merit LPE, for various values of the hole diameter d. This figure shows that a peak only occurs in the LPE when the hole diameter is smaller than a critical value $d_c$; at this value the LPE is constant for small N.

For very small apertures, LPE increases sharply with N at small N, because the resonance becomes better defined as the number of rings is increased, and the transmission peak becomes both narrower and higher. But once the optimal number of rings is reached, further illumination only results in decreasing $I_{inc}$, and the LPE decreases as $1/N^2$. The data obtained on single holes suggest that the optimal number of rings where the crossover occurs is N≈6.

Based on the above experimental results, optical elements according to the present invention are produced. Hereafter, preferred embodiments of the present invention will be described with reference to FIGS. 6–11.

It should be noted that the term "optical recording medium" used in this disclosure means any medium allowing at least data writing by using a light beam. Accordingly, it is not limited to phase-change media. In the case of magneto-optical material, there is a medium in which data writing is optically and data reading is magnetically performed. Such a magneto-optical medium should be also included in the optical recording medium.

First Embodiment

Figure 6:
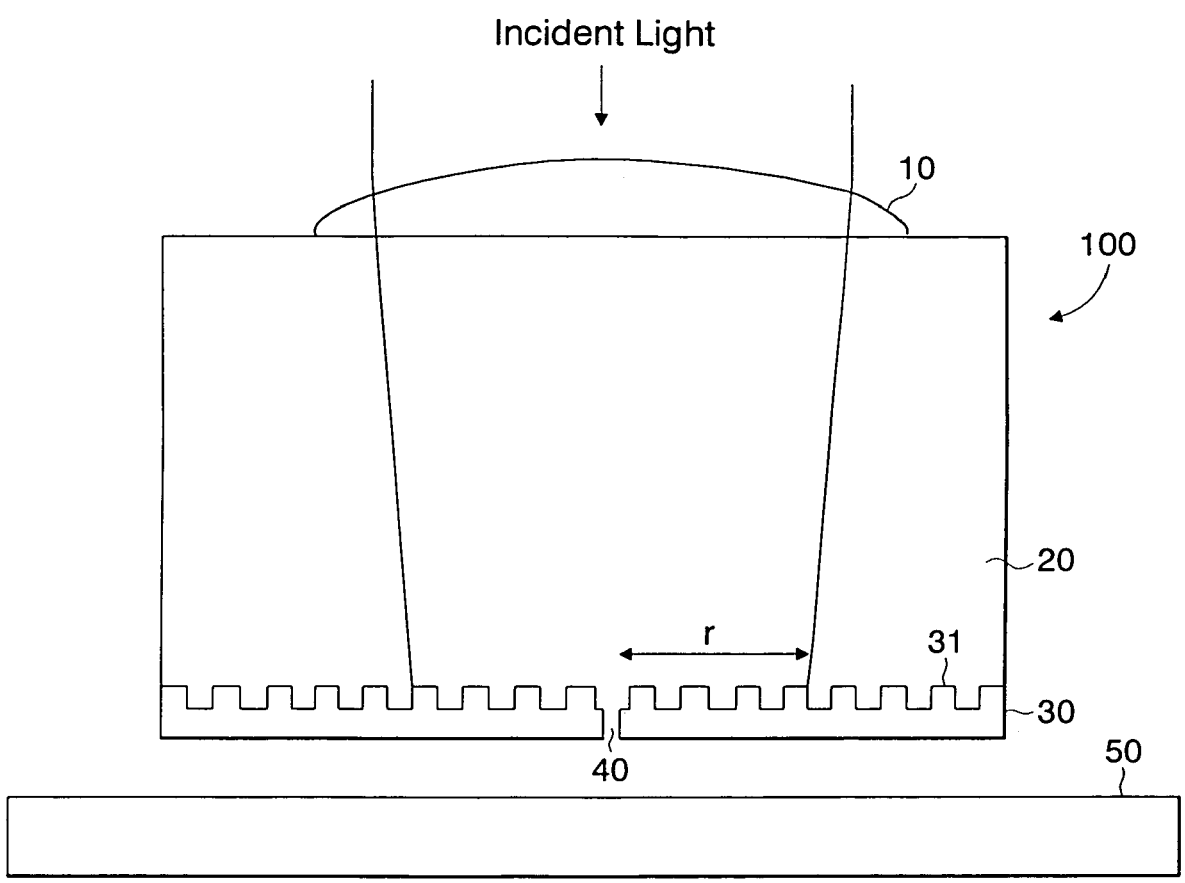
FIG. 6 is a sectional side view of an optical element according to a first embodiment of the present invention.

Referring to FIG. 6, an optical element 100 according to a first embodiment of the present invention is provided with a focus lens 10, an optical element body 20, and a conductive film 30. The optical element 100 is placed near an optical recording medium 50. The focus lens 10 is in contact with the optical element body 20 or may be separately provided. The optical element body 20 is made of transparent material such as optical glass or quartz.

The conductive film 30 is provided on an end surface of the optical element body 20, the end surface being placed near the optical recording medium 50. The conductive film 30 is made of metal such as silver or doped semiconductor and has an aperture 40 perforating through. The shape of the aperture is described in U.S. application Ser. No. 10/098, 970, incorporated herein by reference. As described before, the exit size of the aperture 40 determines the resolution of an optical device. The diameter d of the aperture 40 is preferably equal to or smaller than the wavelength of incident light to the aperture 40.

The conductive film 30 has the periodic surface topography 31 where plural depressions are concentrically arranged in a periodic pattern. The periodic surface topography 31 may be formed by semi-spherical protrusions or other shaped surface features, such as, e.g. square wave or sinusoidal cross section.

The incident light to the focus lens 10 is focused and applied to the periodic surface topography 31 formed by the concentrically and periodically arranged depressions around the aperture 40 to form an irradiated area of radius r. The conductive film 30 is located at the focal plane of the focus lens 10.

The optical element 100 is manufactured as follows. A micro lens of 0.1 mm diameter and NA=0.1 is bonded on one surface of a 1.0 mm-thick optical glass substrate and thereby incident light to the micro lens is focused to form an irradiated area of approximately 4 μm diameter on the opposite surface of the optical glass substrate. In this irradiated area of the opposite surface, surface features allowing enhanced transmission of light through a small aperture are formed.

The surface of the optical glass substrate is etched using a focused ion beam system (FIB) to produce a concentric pattern of depressions about 100 nm in depth with a period of 400 nm for operation at lambda=630–670 nm. Thereafter, an Ag film 30 having a thickness of 300 nm is deposited on the concentric pattern of depressions by DC sputtering. At the center of the concentric pattern of depressions, an aperture having a diameter of 200 nm is formed using the FIB.

The periodic surface topography provided on the conductive film may be formed by not only concentric ring-shaped depressions but also protrusions on the surface and/or depressions in the surface, which do not perforate through the conductive film. For example, dimples, semi-spherical protrusions, grooves, ring-shaped semi-spherical protrusions, concentric ring-shaped grooves, concentric ring-shaped protrusions, and combinations thereof.

The periodic surface topography may be provided on either the exposed surface facing the optical recording medium 50 or on the surface at the conductive film-optical element body interface. In the case where the periodic surface topography is provided on the exposed surface facing the optical recording medium 50, the dielectric constant $\epsilon_d$ of a dielectric on the periodic surface topography should be set to the dielectric constant of air, or air and the storage medium (effective $\epsilon_d$) or the sliding liquid and the storage medium. A period a of the periodic surface topography calculated by substituting the dielectric constant of air as $\epsilon_d$ into the equation (1) is different from that calculated by substituting the dielectric constant of the optical element body 20 as $\epsilon_d$ into the equation (1).

After the concentric pattern of depressions is formed on the surface of the optical glass substrate, the metal film is deposited and then the surface of the metal film is polished.

Further, when the small aperture is blocked with contaminations, the transmitted light power is drastically reduced. Accordingly, it is preferable that the small aperture is filled with transparent dielectric material to prevent it from being blocked with contaminations and the like. This has the added advantage that the effective wavelength inside the aperture is shortened with respect to that in air, to $$\frac{\lambda_{vac}}{n},$$

which gives an additional boost to the transmission.

Second Embodiment

Figure 7:
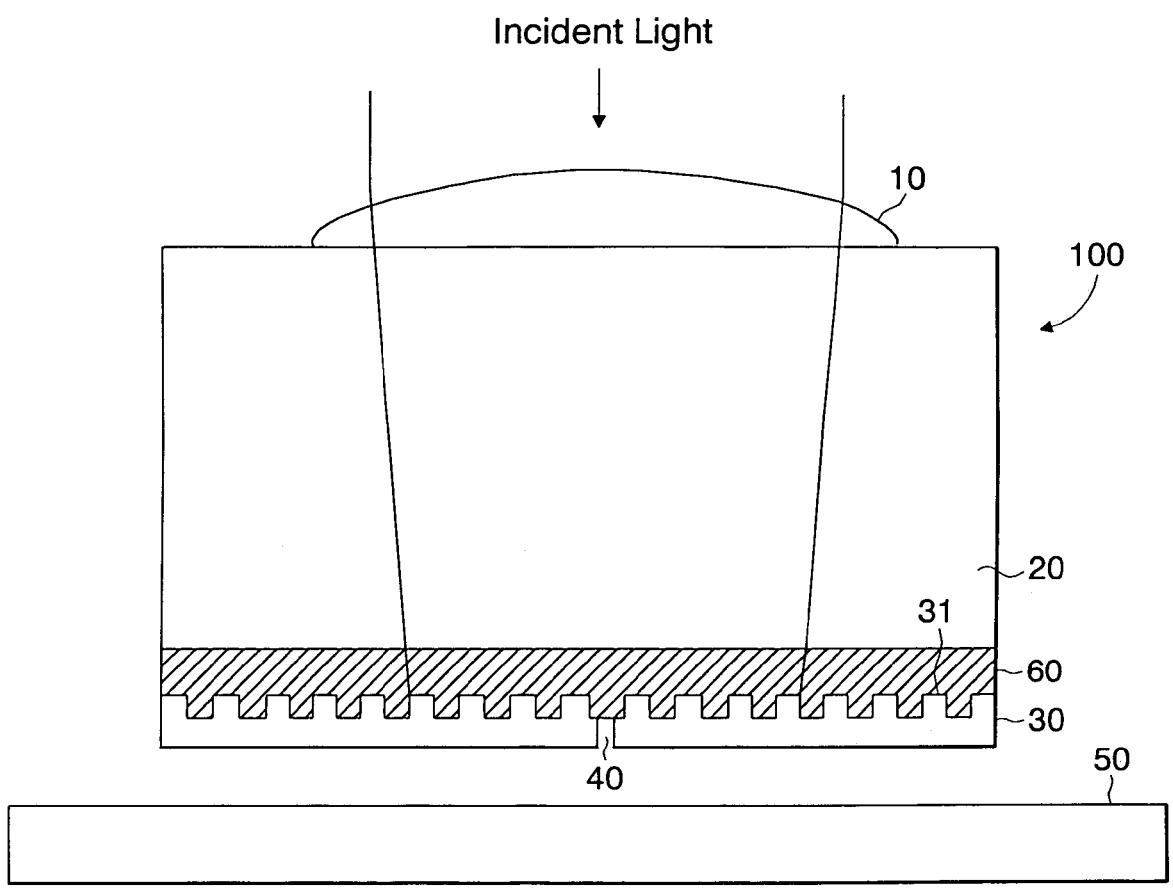
FIG. 7 is a sectional side view of an optical element according to a second embodiment of the present invention.

Referring to FIG. 7, an optical element 100 according to a second embodiment of the present invention is provided with a focus lens 10, an optical element body 20, a high-refractive-index material film 60, and a conductive film 30. The optical element 100 is placed near an optical recording medium 50. The focus lens 10 is in contact with the optical element body 20 or may be separately provided. The optical element body 20 is made of transparent material such as optical glass or quartz.

The high-refractive-index material film 60 is provided on an end surface of the optical element body 20, the end surface being placed near the optical recording medium 50. The high-refractive-index material film 60 is made of a material having a refractive index higher than that of the optical element body 20, for example, a metal oxide such as titanium oxide or semiconductor such as silicon. Further, the conductive film 30 is deposited on the high-refractive-index material film 60. In order for the high refractive index film to be effective, its thickness must be at least 2–3 times the depth into which the electromagnetic fields from the surface plasmons penetrate into the dielectric.

The conductive film 30 is made of metal such as silver or doped semiconductor and has an aperture 40 perforating through the conductive film 30. As described before, the size of the aperture 40 determines the resolution of an optical device. The diameter d of the aperture 40 is preferably equal to or smaller than the wavelength of incident light to the aperture 40.

A periodic surface topography 31 is provided on the surface at the interface between the conductive film 30 and the high-refractive-index material film 60.

The optical element 100 as shown in FIG. 7 is manufactured as follows. A micro lens of 0.1 mm diameter and NA=0.1 is bonded on one surface of a 1.0 mm-thick optical glass substrate. A 200 nm-thick $TiO_2$ film is deposited on the other surface by a RF sputtering using a $TiO_2$ target. The exposed surface of the $TiO_2$ film is etched using a focused ion beam system (FIB) to produce a concentric pattern of depressions about 50 nm in depth with a period of 220 nm. Thereafter, an Ag film 30 having a thickness of 300 nm is deposited on the concentric pattern of depressions of the $TiO_2$ film by DC sputtering. At the center of the concentric pattern of depressions, an aperture having a diameter of 200 nm is formed using the FIB. Subsequently, the exposed surface of the Ag film 30 is polished to be flattened.

As described before, the normalized transmitted light power becomes larger with increasing the number of periods of periodic surface topography. Accordingly, when the irradiation radius r is constant, the light power efficiency can be increased by shortening a period obtained from the equation (1). The period can be effectively shortened by forming a layer 60 of material having a refractive index higher than that of the optical element body 20 on at least one surface of the conductive film 30.

Dielectric constant $\epsilon_d$, calculated period a, and the number of periods within a radius of 1 µm for various optical materials are shown in Table I.

TABLE I

| Optical Material | Dielectric Constant εd | Period a (µm) | The number of periods within r = 1 µm |
|---|---|---|---|
| $SiO_2$ | 2.1 | 0.42 | 2.4 |
| $Al_2O_3$ | 2.6 | 0.38 | 2.7 |
| $ZrO_2$ | 4 | 0.29 | 3.5 |
| SiN | 4 | 0.29 | 3.5 |
| $Ta_2O_5$ | 5.3 | 0.24 | 4 |
| $TiO_2$ | 5.8 | 0.22 | 4.5 |
| Si | 14.44 | 0.08 | 12.5 |

Note:
Period a (µm) is calculated from the equation (1) at λ = 650 nm; and $\epsilon_d = n^2$ where n is the refractive index with the exception that λ must be longer than 1.1 µm for silicon.

It is apparent from Table I that an optical material having a refractive index higher than that of silicon dioxide ($SiO_2$) that is a material of the optical element body 20 allows the period a calculated from the equation (1) to decrease and the number of periods within a radius of 1 µm to increase. Therefore, the light power efficiency can be increased by forming a layer of material having a refractive index higher than that of the optical element body 20 on at least one surface of the conductive film 30.

Third Embodiment

Figure 8:
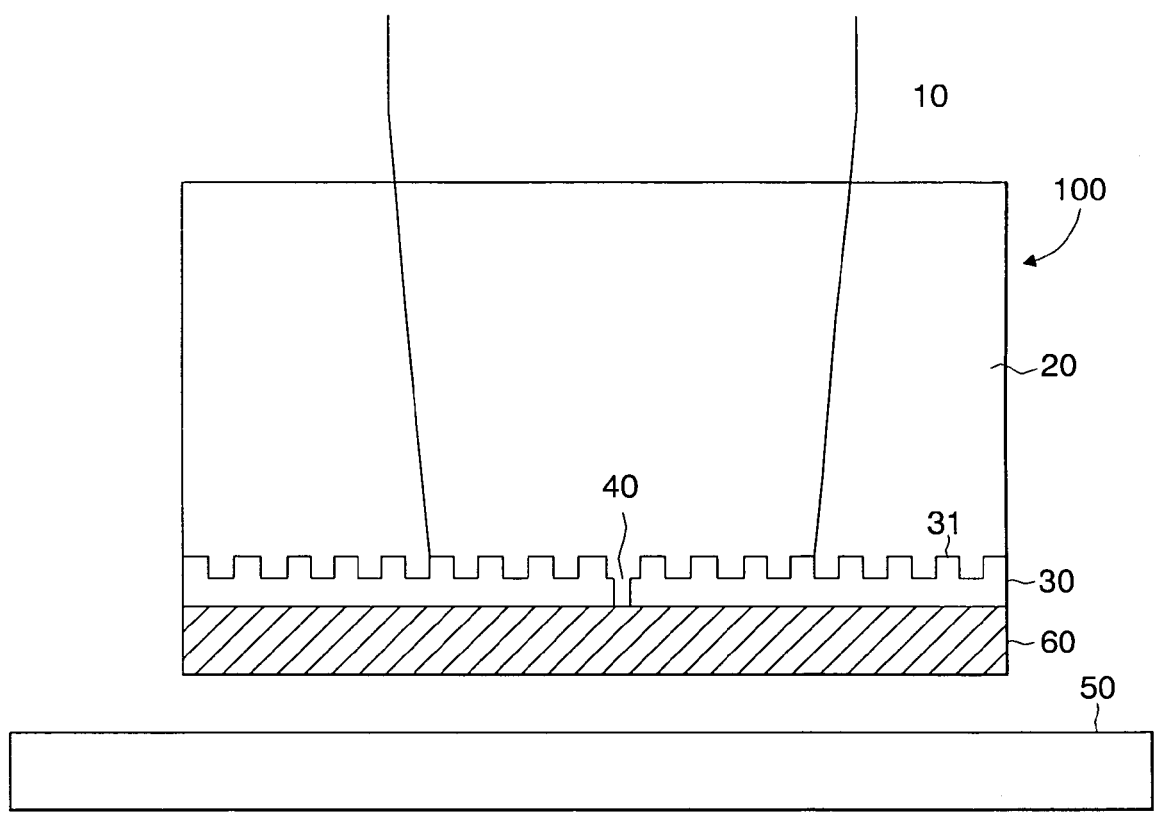
FIG. 8 is a sectional side view of an optical element according to a third embodiment of the present invention.

Referring to FIG. 8, a third embodiment of the present invention is different from the second embodiment as shown in FIG. 7 in that the high-refractive-index material film 60 is provided on one surface of the conductive film 30, which faces the optical recording medium 50. Since materials and the main structure employed in the third embodiment are similar to those in the second embodiment, members similar to those described with reference to FIG. 7 are denoted by the same reference numerals and the details are omitted.

The high-refractive-index material film 60 may employ a multi-layer structure composed of two or more layers made of different materials.

It is possible to provide an interface layer between the high-refractive-index material film 60 and the conductive film 30 to achieve improved adhesion and reliability. In this case, it is preferable that the thickness of the interface layer is sufficiently smaller than the penetration depth of the surface plasmon fields. Examples of materials for the interface layers having a low $\epsilon_i$, are, for example, Ti and Cr.

Fourth Embodiment

Figure 9:
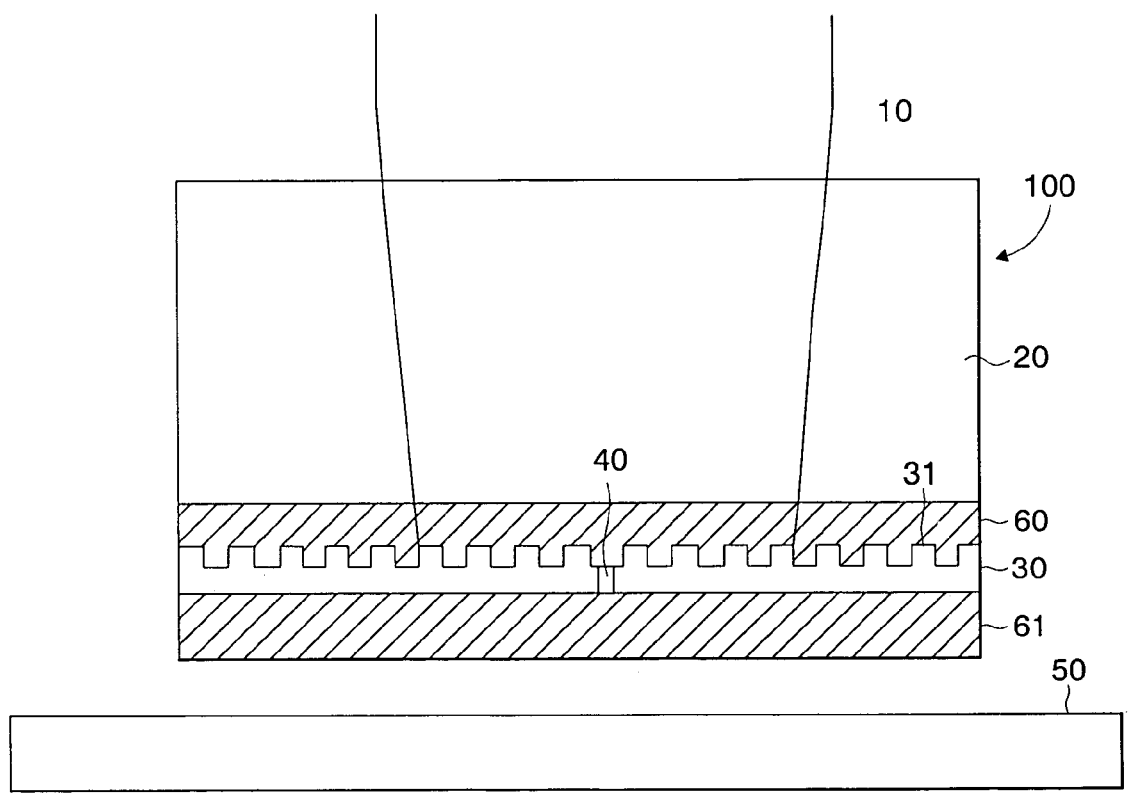
FIG. 9 is a sectional side view of an optical element according to a fourth embodiment of the present invention.

Referring to FIG. 9, a fourth embodiment of the present invention is different from the second embodiment as shown in FIG. 7 in that another high-refractive-index material film 61 is further provided on the other surface of the conductive film 30, which faces the optical recording medium 50. In other words, high-refractive-index material films 60 and 61 are provided on both surfaces of the conductive film 30, respectively. The high-refractive-index material film 61 is made of the same material as the high-refractive-index material film 60.

Since materials and the main structure employed in the fourth embodiment are similar to those in the second embodiment, members similar to those described with reference to FIG. 7 are denoted by the same reference numerals and the details are omitted.

Each of the high-refractive-index material films 60 and 61 may employ a multi-layer structure composed of two or more layers made of different materials. The high-refractive-index material films 60 and 61 may be made of different materials.

It is possible to provide an interface layer between each of the high-refractive-index material films 60 and 61 and the conductive film 30 to achieve improved adhesion and reliability. In this case, it is preferable that the thickness of the interface layer is sufficiently smaller than the penetration depth of the surface plasmon fields.

Fifth Embodiment

An optical element according to a fifth embodiment of the present invention has a high-thermal-conductivity material layer provided between the conductive film 30 and the optical element body 20. The high-thermal-conductivity material layer is made of a material having a thermal conductivity higher than that of the optical element body 20. Such a high-thermal-conductivity material layer can prevent the conductive film 30 from rising in temperature.

Thermal conductivities for various optical materials are shown in Table II.

TABLE II

| Optical Material | Thermal Conductivity (W/cmK) @ 27 degrees Celsius |
|---|---|
| $SiO_2$ | 0.12 |
| $Al_2O_3$ | 0.26 |
| SiN | 0.33 |
| Amorphous carbon | 0.3 |
| Germanium | 0.6 |
| NiO | 0.82 |
| BeO | 2.1 |
| Diamond | 6.6 |
| Si | 1.7 |

By using a material having a thermal conductivity higher than that of $SiO_2$ (the optical element body 20), the conductive film 30 can be effectively prevented from rising in temperature under condition of the same incident light power.

Optical Head

Figure 10:
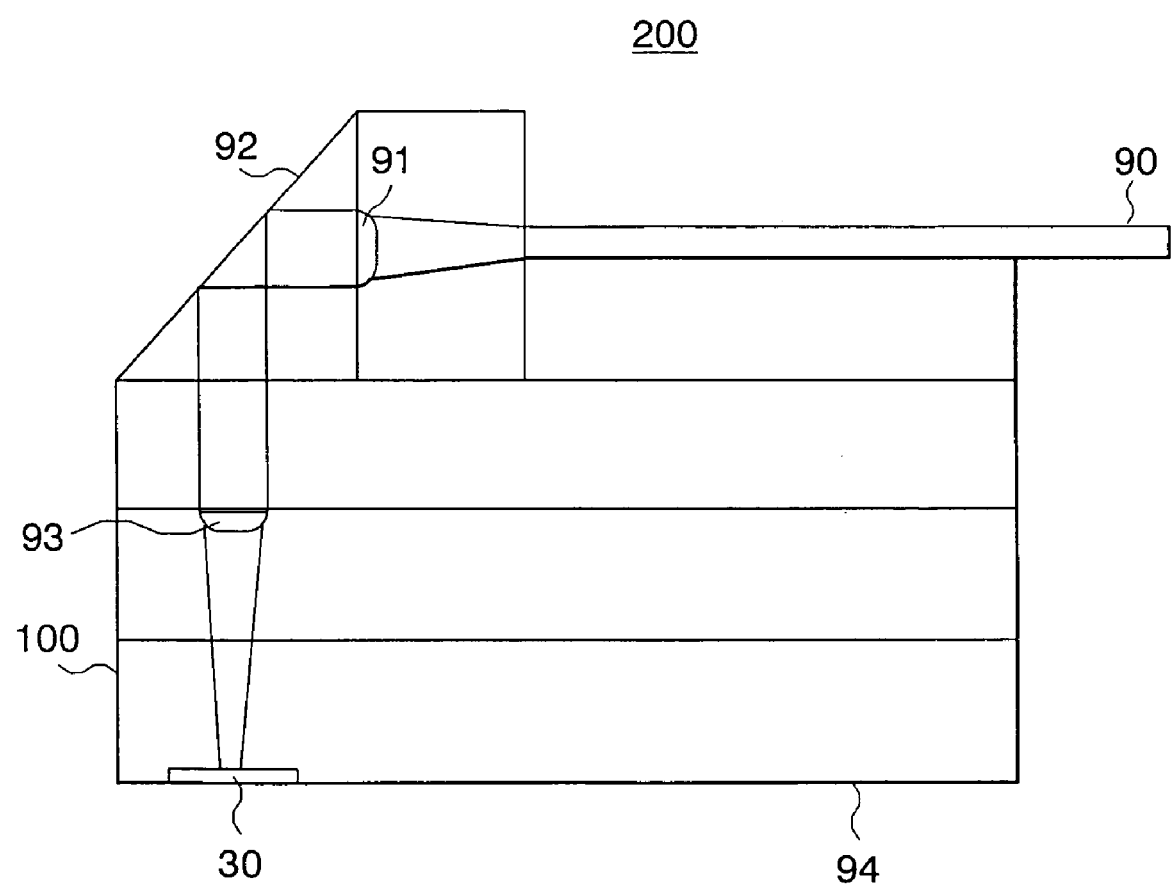
FIG. 10 is a sectional side view of an optical head employing an optical element according to the above embodiments of the present invention.

Referring to FIG. 10, an optical head 200 employs an optical element 100 according to the above embodiments of the present invention. A transmitted light beam through the aperture of the optical element 100 as described above is used to write data onto the optical recording medium.

A light beam emitted from a semiconductor laser (not shown) is guided through an optical fiber 90 to the optical head 200. The optical fiber 90 is fixed to the optical head 200 by means of a mechanical guide. The light beam output from the optical fiber 90 is collimated by a micro lens 91 and the collimated light beam is reflected off a total reflection mirror 92 to change its direction at 90 degrees toward the optical element 100.

The optical element 100 is provided with a micro lens 93, which causes the incident light beam to be focused and applied to a flying surface 94 of the optical element 100. The diameter of an irradiated area on the fly surface 94 is approximately 5 µm. In the irradiated area, a conductive film 30 having a surface feature formed therein in the same manner as described before. In this example, the fly surface 94 is shaped like a slider so as to float on the optical recording medium at a predetermined height when the optical recording medium is rotating.

It is possible to provide the conductive film 30 of the optical head 200 with a photo detector on the surface of the optical recording medium side to read data from the optical recording medium. The photo detector detects light reflected by the optical recording medium to convert it into an electric signal.

Optical Recording and Reading Apparatus

Figure 11:
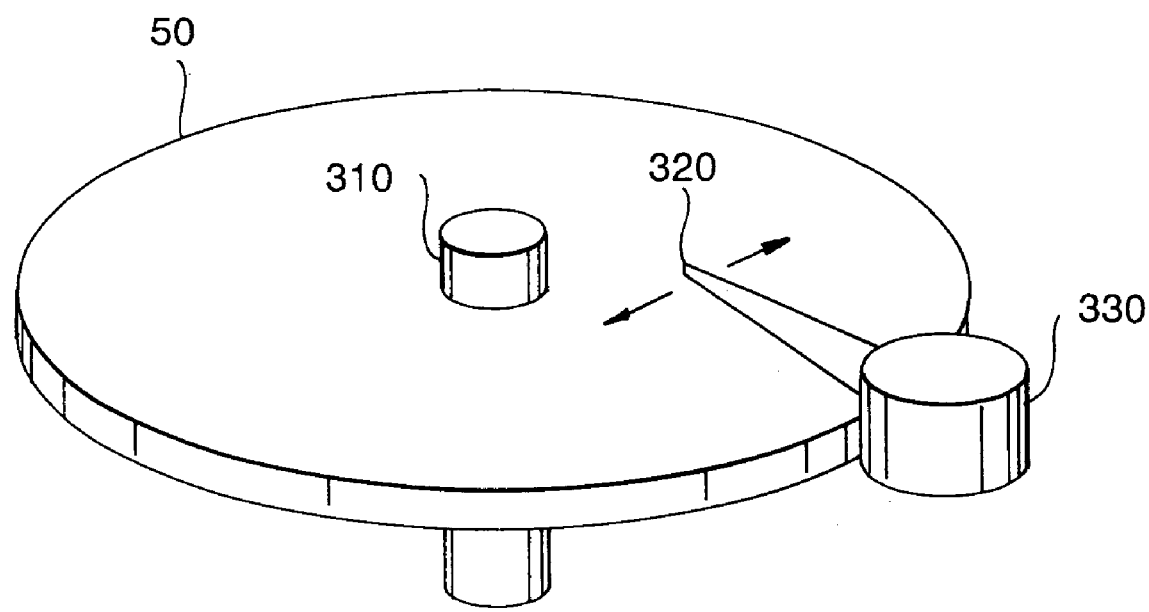
FIG. 11 is a perspective view of an optical recording and reading apparatus employing an optical element according to the above embodiments of the present invention.

Referring to FIG. 11, an optical recording and reading apparatus 300 includes an optical recording medium 50 which rotates around a rotation axis 310, a suspension 320 having the optical head 200 fixed at an end portion thereof, and a head actuator 330 for rotating the suspension 320 so that the optical head 200 moves in directions indicated by arrows. When rotating the optical recording medium 50 at high speeds around the axis 310, the optical head 200 fixed at the end of the suspension 320 floats on the optical recording medium 50 while a distance between the conductive film 30 and the optical recording medium 50 is kept 100 nm or less. Accordingly, a higher data density on an optical recording medium can be achieved than ever before.

As described before, it is possible to provide the conductive film 30 of the optical head 200 with a photo detector to read data from the optical recording medium.

Alternatively, it is possible that the optical head 200 is used as a write head and another read head is provided in the other side of the optical recording medium. The read head detects light transmitted through the optical recording medium to read data. Further, in the case of the optical recording medium being a magneto-optical recording medium, a head using magnetoresistance effect can be also used to detect leakage magnetic flux from the medium to read data.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

The invention claimed is:

1. An optical element comprising:
  an optical element body;
  a conductive film having a first surface and a second surface, the first surface facing the optical element body, wherein the conductive film further has an aperture provided therein and perforating from the first surface to the second surface, and a periodic surface topography provided on one of the first and second surfaces thereof; and a focus lens for focusing an incident beam to produce a focused light beam of a predetermined diameter on the first surface.

2. The optical element of claim 1 wherein the predetermined diameter of the focused light beam on the first surface and a period of the periodic surface topography are determined so that, with respect to a power of the focused light beam on the first surface, a power of transmitted light through the aperture is greater than that of transmitted light which would be transmitted through the aperture if no periodic surface topography is provided in the conductive film.

3. An optical element comprising:
an optical member for focusing incident light from a light source to produce a focused light beam; and
a conductive film having a first surface and a second surface, the first surface being in contact with the optical member, wherein the conductive film further has an aperture provided therein and perforating from the first surface to the second surface, and a periodic surface topography provided on one of the first and second surfaces thereof, wherein the focused light beam on the first surface excites a surface plasmon mode on one of the first and second surfaces thereby enhancing transmission of light through the aperture,
wherein a diameter of the light beam on the first surface and a period of the periodic surface topography are determined so that a light power ratio of transmitted light through the aperture to the focused light beam on the first surface is greater than a light power ratio that would be obtained if no periodic surface topography is provided in the conductive film.

4. The optical element according to claim 1, wherein the aperture has a diameter smaller than a wavelength of the light beam.

5. The optical element according to claim 1, wherein the periodic surface topography comprises a plurality of surface features periodically arranged around the aperture.

6. The optical element according to claim 5, wherein the plurality of surface features is further concentrically arranged around the aperture.

7. The optical element according to claim 5, wherein the surface features include one selected from a shape group consisting of depression, square wave or sinusoidal cross section, semi-spherical protrusion, groove, protrusion, ring-shaped depression, ring-shaped and semi-spherical protrusion, ring-shaped groove, and ring-shaped protrusion.

8. The optical element according to claim 7, wherein the surface features include a plurality of ones selected from a shape group consisting of depression, square wave or sinusoidal cross section, semi-spherical protrusion, groove, protrusion, ring-shaped depression, ring-shaped and semi-spherical protrusion, ring-shaped groove, and ring-shaped protrusion.

9. An optical element having a multi-layer structure comprising:
an optical member for focusing an incident light to produce a focused light beam;
a conductive film having a first surface and a second surface, the first surface facing the optical member, wherein the conductive film further has an aperture provided therein and perforating from the first surface to the second surface, and a periodic surface topography provided on one of the first and second surfaces thereof; and
a layer of optical material having a reflective index higher than that of the optical member is provided on one of the first and second surfaces of the conductive film,
wherein a diameter of the focused light beam on the first surface and a period of the periodic surface topography are determined so that, with respect to a power of the light beam on the first surface, a power of transmitted light through the aperture is greater than that of transmitted light which would be transmitted through the aperture if no periodic surface topography is provided in the conductive film.

10. The optical element according to claim 9, wherein the optical material comprises at least one selected from a group consisting of titanium oxide, zirconium oxide, tantalum oxide, alumina, silicon nitride, and silicon.

11. An optical element having a multi-layer structure comprising:
an optical member for focusing an incident light to produce a focused light beam;
a conductive film having a first surface and a second surface, the first surface facing the optical member, wherein the conductive film further has an aperture provided therein and perforating from the first surface to the second surface, and a periodic surface topography provided on one of the first and second surfaces thereof; and
a high-thermal-conductivity layer of material having a thermal conductivity higher than that of the optical member is provided between the conductive film and the optical member,
wherein a diameter of the focused light beam on the first surface and a period of the periodic surface topography are determined so that, with respect to a power of the light beam on the first surface, a power of transmitted light through the aperture is greater than that of transmitted light which would be transmitted through the aperture if no periodic surface topography is provided in the conductive film.

12. The optical element according to claim 11, wherein the material comprises at least one selected from a group consisting of diamond, beryllium oxide, nickel oxide, alumina, silicon nitride, amorphous carbon, silicon, and germanium.

13. The optical element according to claim 11, further comprising:
a layer of optical material having a refractive index higher than that of the optical member is provided on at least one of the first and second surfaces of the conductive film.

14. The optical element according to claim 1, wherein the diameter of the light beam is determined within a range from two periods to six periods of the periodic surface topography.

15. The optical element according to claim 9, wherein the diameter of the light beam is determined within a range from two periods to six periods of the periodic surface topography.

16. The optical element according to claim 11, wherein the diameter of the light beam is determined within a range from two periods to six periods of the periodic surface topography.

17. The optical element according to claim 4, wherein a ratio (d/λ) of the diameter d of the aperture to the wavelength λ of the light beam is not greater than 0.3.

18. The optical element according to claim 1, wherein the aperture is filled with a transparent dielectric.

19. The optical element according to claim 9, wherein the aperture is filled with a transparent dielectric.

20. The optical element according to claim 11, wherein the aperture is filled with a transparent dielectric.

21. An optical head placed near an optical recording medium, comprising:
- a wave guide for guiding light emitted from a light source;
- a light condenser optically connected to the wave guide, for focusing the light to produce a focused light beam; and
- a conductive film having a first surface and a second surface, the first surface facing the light condenser, wherein the conductive film further has an aperture provided therein and perforating from the first surface to the second surface, and a periodic surface topography provided on one of the first and second surfaces thereof, wherein the aperture is placed near a surface of the optical recording medium,
- wherein a diameter of the focused light beam on the first surface and a period of the periodic surface topography are determined so that, with respect to a power of the light beam on the first surface, a power of transmitted light through the aperture is greater than that of transmitted light which would be transmitted through the aperture if no periodic surface topography is provided in the conductive film.

22. The optical head according to claim 21, further comprising:
- a slider for floating the optical head on the surface of the optical recording medium at a predetermined height when the optical recording medium is rotating.

23. The optical head according to claim 22, wherein
the wave guide comprises an optical fiber; and
the light condenser comprises:
- a collimating lens for collimating the light emitted from the optical fiber to produce a collimated light beam;
- a light direction changer for changing a direction of the collimated light beam at a predetermined angle; and
- a focus lens for focusing the collimated light beam incident from the light direction changer to produce the focused light beam,
wherein the second surface of the conductive film is substantially flush with a floating surface of the slider.

24. The optical head according to claim 21, wherein the transmitted light through the aperture is used to write information onto the optical recording medium.

25. The optical head according to claim 21, further comprising:
- a photo detector for detecting light reflected off the surface of the optical recording medium to read information from the optical recording medium, wherein the photo detector is placed near the aperture.

26. The optical head according to claim 25, wherein the photo detector is provided in the conductive film at a position placed near the aperture on the second surface of the conductive film.

27. The optical head according to claim 25, further comprising:
- a slider for floating the optical head on the surface of the optical recording medium at a predetermined height when the optical recording medium is rotating.

28. The optical head according to claim 27, wherein
the wave guide comprises an optical fiber; and
the light condenser comprises:
- a collimating lens for collimating the light emitted from the optical fiber to produce a collimated light beam;
- a light direction changer for changing a direction of the collimated light beam at a predetermined angle; and
- a focus lens for focusing the collimated light beam incident from the light direction changer to produce the focused light beam,
wherein the second surface of the conductive film is substantially flush with a floating surface of the slider.

29. An apparatus for recording and reading information to and from an optical recording medium, comprising:
- an optical head; and
- a head actuator for moving the optical head to a desired position on the optical recording medium,
wherein the optical head comprises:
- a wave guide for guiding light emitted from a light source;
- a light condenser optically connected to the wave guide, for focusing the light to produce a focused light beam;
- a conductive film having a first surface and a second surface, the first surface facing the light condenser, wherein the conductive film further has an aperture provided therein and perforating from the first surface to the second surface, and a periodic surface topography provided on one of the first and second surfaces thereof, wherein the aperture is placed near a surface of the optical recording medium; and
- a photo detector for detecting light reflected off the surface of the optical recording medium to read information from the optical recording medium, wherein the photo detector is placed near the aperture,
wherein a diameter of the focused light beam on the first surface and a period of the periodic surface topography are determined so that, with respect to a power of the focused light beam on the first surface, a power of transmitted light through the aperture is greater than that of transmitted light which would be transmitted through the aperture if no periodic surface topography is provided in the conductive film.

30. The apparatus according to claim 29, further comprising:
- a slider for floating the optical head on the surface of the optical recording medium at a predetermined height when the optical recording medium is rotating.

31. The apparatus according to claim 30, wherein
the wave guide comprises an optical fiber; and
the light condenser comprises:
- a collimating lens for collimating the light emitted from the optical fiber to produce a collimated light beam;
- a light direction changer for changing a direction of the collimated light beam at a predetermined angle; and
- a focus lens for focusing the collimated light beam incident from the light direction changer to produce the focused light beam,
wherein the second surface of the conductive film is substantially flush with a floating surface of the slider.

32. The apparatus according to claim 29, wherein the photo detector is provided in the conductive film at a position placed near the aperture on the second surface of the conductive film.

33. An apparatus for recording and reading information to and from an optical recording medium, comprising:
- an optical write head for writing information to the optical recording medium by irradiating the optical recording medium with a writing light beam;
- an optical read head for reading information from the optical recording medium by detecting a light beam transmitted through the optical recording medium; and a head actuator for moving the optical write head and the optical read head to a desired position on the optical recording medium, wherein the optical write head comprises:

a wave guide for guiding light emitted from a light source;

a light condenser optically connected to the wave guide, for focusing the light to produce a focused light beam; and a conductive film having a first surface and a second surface, the first surface facing the light condenser, wherein the conductive film further has an aperture provided therein and perforating from the first surface to the second surface, and a periodic surface topography provided on one of the first and second surfaces thereof, wherein the aperture is placed near a surface of the optical recording medium, wherein a diameter of the focused light beam on the first surface and a period of the periodic surface topography are determined so that, with respect to a power of the focused light beam on the first surface, a power of the writing light beam transmitted through the aperture is greater than that of transmitted light which would be transmitted through the aperture if no periodic surface topography is provided in the conductive film.

34. An apparatus for recording and reading information to and from a magneto-optical recording medium, comprising:

a write head for optically writing information to the magneto-optical recording medium by irradiating the optical recording medium with a writing light beam;

a read head for reading information from the magneto-optical recording medium by detecting leakage magnetic flux from the magneto-optical recording medium using magnetoresistance effect; and a head actuator for moving the write head and the read head to a desired position on the optical recording medium, wherein the write head comprises:

a wave guide for guiding light emitted from a light source;

a light condenser optically connected to the wave guide, for focusing the light to produce a focused light beam; and a conductive film having a first surface and a second surface, the first surface facing the light condenser, wherein the conductive film further has an aperture provided therein and perforating from the first surface to the second surface, and a periodic surface topography provided on one of the first and second surfaces thereof, wherein the aperture is placed near a surface of the optical recording medium, wherein a diameter of the focused light beam on the first surface and a period of the periodic surface topography are determined so that, with respect to a power of the focused light beam on the first surface, a power of the writing light beam transmitted through the aperture is greater than that of transmitted light which would be transmitted through the aperture if no periodic surface topography is provided in the conductive film.

* * * * *